(12) United States Patent
Derrick

(10) Patent No.: US 11,193,812 B2
(45) Date of Patent: Dec. 7, 2021

(54) ELECTROMAGNETIC CONVEYOR WITH WEIGHING STATION

(71) Applicant: B&R INDUSTRIAL AUTOMATION GMBH, Eggelsberg (AT)

(72) Inventor: Stacey Derrick, Atlanta, GA (US)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 175 days.

(21) Appl. No.: 16/458,406

(22) Filed: Jul. 1, 2019

(65) Prior Publication Data

US 2021/0003444 A1   Jan. 7, 2021

(51) Int. Cl.
  *G01G 11/00* (2006.01)
  *G01G 11/04* (2006.01)
  *B65G 54/02* (2006.01)

(52) U.S. Cl.
  CPC ......... *G01G 11/003* (2013.01); *B65G 54/02* (2013.01); *G01G 11/04* (2013.01)

(58) Field of Classification Search
  CPC ...... G01G 11/00; G01G 11/003; G01G 11/04; B65G 54/02
  See application file for complete search history.

(56) References Cited

U.S. PATENT DOCUMENTS

| | | | | |
|---|---|---|---|---|
| 4,146,467 A | * | 3/1979 | Sauer | B07C 5/3404 209/643 |
| 4,426,006 A | * | 1/1984 | Horii | B07C 5/18 177/145 |
| 4,566,584 A | * | 1/1986 | Lindstrom | G01G 11/003 177/145 |
| 4,770,260 A | * | 9/1988 | Brook | G01G 11/003 177/145 |
| 5,004,093 A | * | 4/1991 | Blezard | B65B 43/46 141/170 |
| 5,092,414 A | * | 3/1992 | Blezard | G01G 15/00 141/129 |
| 5,256,835 A | * | 10/1993 | Rydzak | G01G 19/005 177/145 |

(Continued)

FOREIGN PATENT DOCUMENTS

| | | |
|---|---|---|
| WO | 98/50760 | 11/1998 |
| WO | 2018/176137 | 10/2018 |

*Primary Examiner* — Randy W Gibson
(74) *Attorney, Agent, or Firm* — Greenblum & Bernstein, P.L.C.

(57) ABSTRACT

Method for weighing an object transported on a mover of an electromagnetic conveyor and electromagnetic conveyor. Method includes lifting object off the mover with a lifting device; setting down object onto at least one transport plane of a weighing station arranged at a weighing region of the track and arranged on at least one weigh cell. The transport plane extends in the direction of movement to support the object when in the weighing station. The method also includes actively driving object while lifted off from the mover and while supported on the transport plane with the mover as it moves along the track through a weighing region; weighing object with at least one weigh cell while the object is supported by the transport plane; and setting down object on the mover after weighing in the weighing station for onward movement of object along the track with the mover.

15 Claims, 3 Drawing Sheets

(56) References Cited

U.S. PATENT DOCUMENTS

| | | | | |
|---|---|---|---|---|
| 5,293,630 A * | 3/1994 | Tatge | ................... | G06F 9/4484 |
| | | | | 718/100 |
| 5,306,877 A * | 4/1994 | Tas | ............................ | B07C 5/18 |
| | | | | 177/145 |
| 5,740,843 A * | 4/1998 | Burkart | ................... | B65B 43/50 |
| | | | | 141/1 |
| 5,877,457 A * | 3/1999 | Corniani | ................ | B65B 1/32 |
| | | | | 177/116 |
| 5,929,387 A * | 7/1999 | Inglin | ..................... | G01G 15/00 |
| | | | | 177/119 |
| 6,084,184 A * | 7/2000 | Troisi | ..................... | G01G 15/00 |
| | | | | 177/145 |
| 6,096,983 A * | 8/2000 | Ozaki | ................... | G01G 15/00 |
| | | | | 177/52 |
| 6,627,826 B2 * | 9/2003 | Cavina | ................... | B65B 43/52 |
| | | | | 177/145 |
| 6,800,818 B2 * | 10/2004 | Balboni | .................. | B65B 3/003 |
| | | | | 141/83 |
| 7,258,237 B2 * | 8/2007 | Nielsen | ..................... | B07C 5/16 |
| | | | | 209/645 |
| 9,202,719 B2 | 12/2015 | Lu et al. | | |
| 10,308,437 B2 * | 6/2019 | Clossner | .............. | B65G 17/002 |
| 2016/0380562 A1 | 12/2016 | Weber et al. | | |
| 2017/0081052 A1 | 3/2017 | Aichinger et al. | | |
| 2018/0073912 A1 | 3/2018 | Lyman et al. | | |
| 2018/0086564 A1 * | 3/2018 | Clossner | .............. | B65G 17/002 |
| 2019/0002204 A1 | 1/2019 | Reinthaler | | |

* cited by examiner

ELECTROMAGNETIC CONVEYOR WITH WEIGHING STATION

BACKGROUND

1. Field of the Invention

Embodiments relate to a method and arrangement for weighing an object that is transported on a mover of an electromagnetic conveyor, whereas the mover is moved along a stationary track of the electromagnetic conveyor in a direction of movement.

2. Discussion of Background Information

In many manufacturing and production plants and processes objects (e.g. products, containers etc.) are moved along certain transportation routes via conveyors. Conveyors can for example be conventional conveyor belts but also electromagnetic conveyors, such like long stator linear motors or planar motors. In manufacturing and production processes it is often necessary to weigh the moved objects. This is typically done via weighing stations, e.g. inline checkweighers, that are arranged at the required positions along the conveying route. Such weighing stations are normally standalone pieces of equipment with a small section of conveyor built into it. The object to be moved by the conveyor is moved off of the main conveyor onto the weighing station to perform the weighing process. After weighing, the object is indexed onto the main conveyor again or onto a separate conveyor assembly. The issue with such weighing stations is that the continuity of the main conveyor is broken and that extra drive trains, bearings and guide elements are introduced by the weighing station which are additional wear items that require maintenance.

US 2018/0073912 A1 shows an inline checkweigher arranged in a linear motor conveyor. A section of the linear motor directly or indirectly rests on a weigh cell. An object moved on the section is weighed by the weigh cell. The disadvantage of this arrangement is that the weight of the conveyor section and of the mover that carries the object is also weighed by the weigh cell. The weight of the conveyor section can be (much) higher than the weight of the object, making the weighing process less accurate and requiring a weigh cell suitable for higher weights. Moreover, the checkweigher of US 2018/0073912 A1 interrupts the continuous linear motor conveyor.

In US 2017/0081052 A1 an object moved on a conveyor belt is grabbed by a mover of a linear motor that comprises a weigh cell. The conveyor belt is lowered in a weighing region whilst the mover grabs and moves the object. By that the mover carries the complete weight of the object in the weighing region and the weigh cell of the mover is able to weigh the object. Downstream of the weighing region the object is again put down on the conveyor belt for onward movement. This approach requires a great number of movers each equipped with a weigh cell which increases the costs and complexity of the checkweigher.

Thus, there is a need for weighing station that can be used with electromagnetic conveyors and that is simple in design but yet accurate in measuring the weight of a moved object.

SUMMARY

The claimed embodiments address the above-identified deficiencies in the known art. In this regard, as the object is lifted off from the mover in the weighing station whilst still being driven by the mover that is moved through the weighing station by the electromagnetic conveyor, it is not necessary to interrupt the continuous track of the conveyor. The mover simply needs to be moved through the weighing station and the weighing can simply be performed without adverse influence on the movement of the object along the track. The weighing station can be arranged virtually on any position along the track, making the weighing station especially flexible and simple in application. The track does need to be adapted for that. The weighing station can be implemented as checkweigher or for capturing the weight for further usage, for example for quality control or control purposes.

In a simple construction, passive lifting of the object by the movement of the mover is provided. For that an upward ramp can be arranged with the object engaging and moving up the ramp till the transport plane is reached as the mover is moved along the track. At the end of the weighing station the object can simply be placed on the mover again via a downward ramp downstream of the weighing station.

It is also possible to actively lift the object off the mover and/or actively set down the object on the mover by a lifting drive. The lifting drive can be provided on the mover or stationary at the conveyor. It is also possible to arrange the lifting drive on the weighing station and to lift the object with the weighing station.

In order to increase the accuracy of the weighing it is possible that the mover is moved with a speed lower than the speed outside of the weighing station during weighing in the weighing station or that the mover is stopped during weighing in the weighing station.

Weighing accuracy can also be increased when the weight is weighed with more than one weigh cell and the weights obtained by the weigh cells are averaged for determining the weight of the object and/or when the weight is weighed more than one time in the weighing station and the weights obtained are averaged for determining the weight of the object.

Embodiments are directed to a method for weighing an object transported on a mover of an electromagnetic conveyor. The mover is moved along a stationary track of the electromagnetic conveyor in a direction of movement, and the method includes lifting the object off the mover with a lifting device; and setting down the object onto at least one transport plane of a weighing station arranged in a weighing region of the stationary track. The at least one transport plane, which is located on at least one weigh cell, extends in the direction of movement to support the object when in the weighing station. The method also includes actively driving the object while lifted off from the mover and while supported on the at least one transport plane with the mover that is moved along the track through the weighing region, in which a driver is arranged on the mover to engage with the object; weighing the object with the at least one weigh cell while the object is supported by at least one the transport plane of the weighing station; and setting down the object on the mover after weighing in the weighing station for onward movement of the object along the stationary track with the mover.

Embodiments are directed to an electromagnetic conveyor that includes a stationary track, along which a mover is transported in a direction of movement; a weighing station, which is arranged at a weighing region of the stationary track and on at least one weigh cell for weighing an object, the weighing station comprising at least one transport plane extending in the direction of movement; a lifting device configured to lift the object off the mover and to set the object down on the at least one transport plane, which supports the object when in the weighing station; and a driver, which is arranged on the mover, is configured to engage the object throughout the transporting of the mover along the stationary track through the weighing region, whereby the object is actively driven by the mover while lifted off from the mover and while supported on the transport plane. A weight of the object is evaluated from measurement values representative of the measured weight of the object obtained by the at least one weigh cell.

Other exemplary embodiments and advantages of the present invention may be ascertained by reviewing the present disclosure and the accompanying drawing.

BRIEF DESCRIPTION OF THE DRAWINGS

The present invention is explained in more detail below referring to FIGS. 1 to 5, which show exemplary, schematic and non-limiting advantageous embodiments of the invention.

In the drawings.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Electromagnetic conveyors are well known, e.g. as linear motors or planar motors. Such electromagnetic conveyors have a stationary part comprising a plurality of stationary arranged drive coils. The stationary part forms the stator of the electromotor and a track along which a mover of the electromagnetic conveyor may be moved. In a linear motor the drive coils are arranged next to each other on the stationary part of the conveyor. The stationary part of the conveyor does usually also comprise guide structures, e.g. rollers, surfaces, rails, magnets, bearings etc. The mover comprises guide elements, such as rollers, sliding surfaces, magnets, bearings etc., that interact in a guiding manner with the guide structures on the stationary part in order to hold the mover on the track (stationary part) and to guide the mover along the track. In a planar motor, the drive coils are arranged in a plane that defines a movement plane as track in which a mover of the planer motor may be freely moved in two directions defined by the movement plane. In a planar motor the mover is usually magnetically guided, but may also be guided mechanically. The drive coils are controlled by a control system of the electromagnetic conveyor and generate a magnetic field when energized by an electric current. Driving magnets (permanent magnets or electromagnets) are arranged on the mover that are separated from the drive coils by an air gap. Usually the air gap is maintained by the interacting guide structures and guide elements. By controlling energization of the drive coils with the control system a moving magnetic field is generated by the drive coils that interacts with the driving magnets on the mover (or with its produced magnetic flux) in order to move the mover along the track of the linear motor or in the movement plane of the planar motor. The advantage of such electromagnetic conveyors is that a plurality of movers may be moved simultaneously and independently from each other by controlling the drive coils in the region of each mover. Examples of linear motors are given in WO 98/50760 A2, US2016/0380562A1 or US20190002204A1. Examples of planar motors are given in WO 2018/176137 A1 or U.S. Pat. No. 9,202,719 B2.

Figure 1:
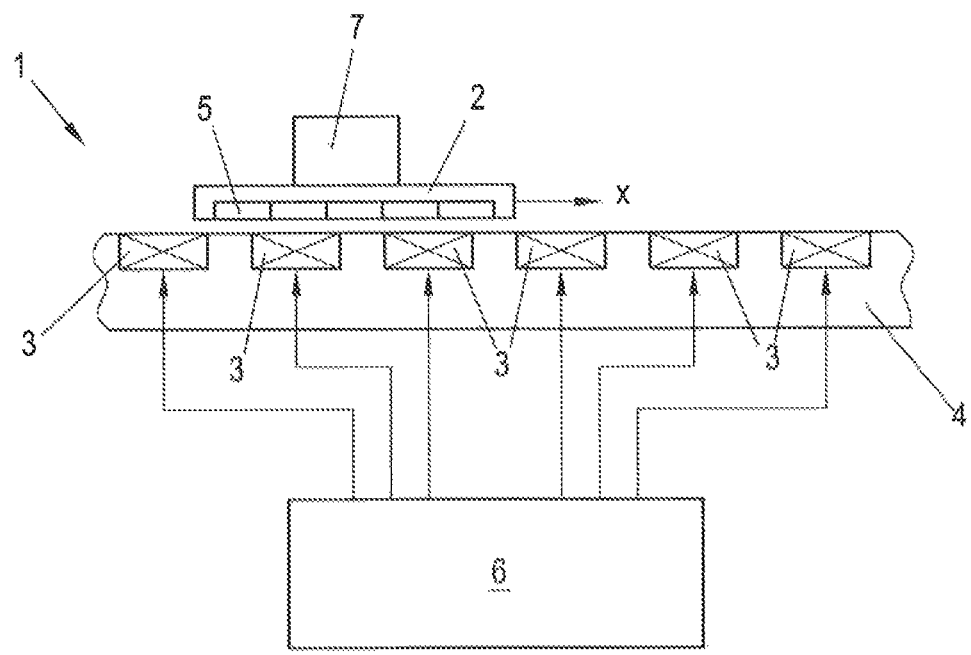
FIG. 1 shows an electromagnetic conveyor.

FIG. 1 shows part of a linear motor as electromagnetic conveyor 1. A plurality of drive coils 3 are arranged next to each other on a stationary conveyor track 4 along which a mover 2 can be moved. For the sake of simplicity, no mechanical or magnetic guiding or bearing features on the conveyor track 4 or the mover are shown. A number of permanent magnets is arranged on the mover 2 as driving magnets 5. The drive coils 3 are controlled by a control system 6 of the electromagnetic conveyor 1 in order to energize the drive coils 3 in the region of the mover 2 in order to generate a moving magnetic field that interacts with the driving magnets 5 of the mover 2 in order to mover the mover 2 along the track 4 with the desired movement trajectory (position, speed, acceleration (also negative), jerk). The same principle of movement applies to a planar motor as electromagnetic conveyor 1 whereas the drive coils 3 are arranged in a plane as conveyor track 4 and the mover 2 may be moved in two directions of the plane by energizing the drive coils 3 in the region of the mover 2. An object 7 is arranged on the mover 2 and is transported along the track 3 with the mover 2.

A mover 2 with an object 7 arranged on the mover 2 for transportation is moved along the track 4 in a direction of movement x. The mover 2 is provided with an object support 22 (see e.g. FIG. 5) on which the object 7 is arranged. The object 7 could hang on the object support 22 or could rest onto the object support 22. The object 7 could also be grabbed and held by an object grabber arranged on the mover 2.

Figure 2:
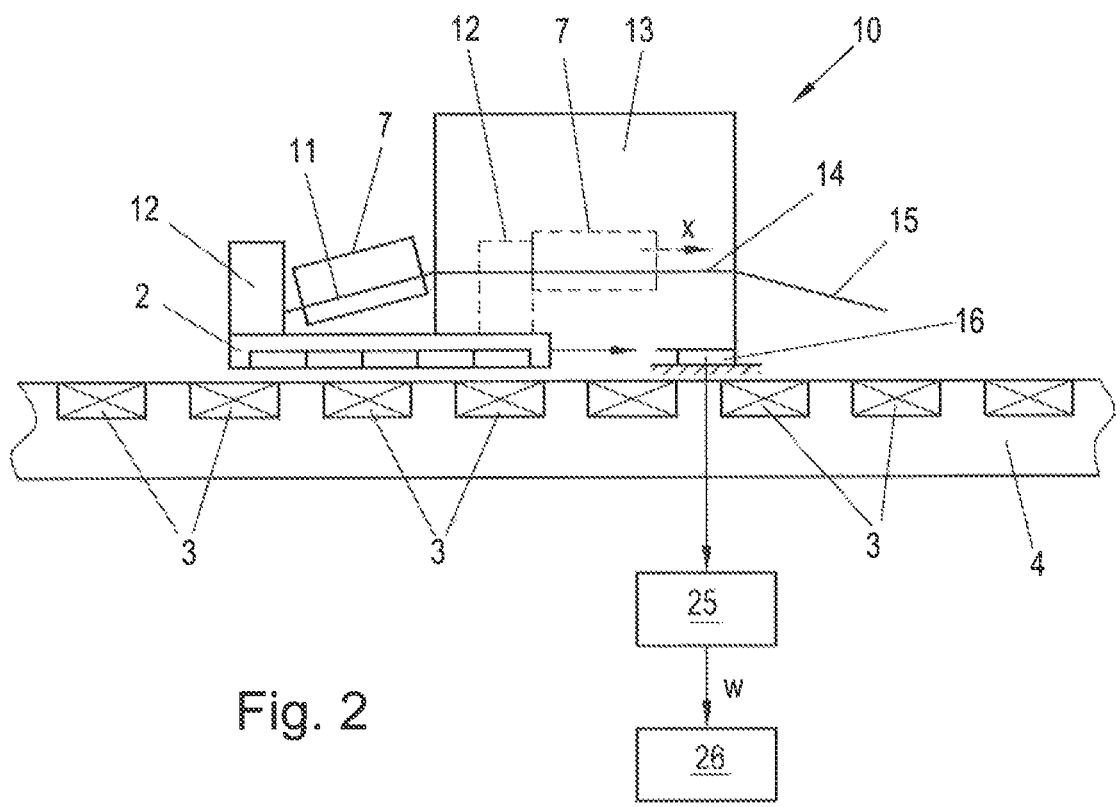
FIG. 2 shows weighing station of the conveyor according to a first embodiment.

The weighing station 13, e.g. of an inline checkweigher 10, according to a first embodiment of the invention is shown in FIG. 2. The weighing station 13 is arranged at a weighing region of the track 4. At least one upward ramp 11, as passive lifting device, is stationary arranged, e.g. on the track 4 or on a stationary construction of the conveyor 1 or its surroundings, e.g. a plant floor, upstream (with respect to the direction of movement x) of the weighing station 13. When the object 7 reaches the ramp 11 the object 7 engages with the ramp 11 in that at least one surface of the object 7 slides on the ramp 11. The ramp 11 could of course also be provided with suitable bearings (e.g. rotating rollers or balls) on which the object 7 would slide upward in order to reduce friction between ramp 11 and object 7. It is to be noted, that the object 7 could also be a defined carrier in which the part to transported is arranged for transportation. In this case a surface of the carrier or the transported part would slide on the ramp 11.

The mover 2 comprises a driver 12, e.g. like in form of a protruding finger as in FIG. 2, that is in engagement with the object 7 throughout the movement of the mover 2 through the weighing station 13. This ensures that the object 7 is actively driven by the mover 2 through the weighing station 13. The object 7 can be pushed or pulled by the driver 12. While the mover 2 moves through the weighing station 13 the object 7, still driven by the mover 2 via the driver 12 and in engagement with the ramp 11, slides up the ramp 11 and is lifted off from the mover 2. By that the object 7 does no more rest on the mover 2 (but is still driven by the mover 2) and the weight of the object 7 is isolated from the mover 2. The height of the ramp 11 and of the driver 12 are of course adjusted to each other to ensure that the object 7 is actively driven by the mover 2 through the weighing station 13.

The weighing station 13 has at least one transport plane 14. The downstream (with respect to the direction of movement x) end of the upward ramp 11 changes over to the transport plane 14 that extend in the direction of movement x so that the object 7 that is pushed upward the ramp 11 by the mover 2 is set down on the transport plane 14 and continuous to move along the transport plane 14 in the weighing station 13 in the direction of movement x (indicated with dashed lines in FIG. 2). The transport plane 14 is preferably, but not necessarily, arranged horizontally. The at least one transport plane 14 could of course also be provided with suitable bearings (e.g. rotating rollers or balls) on which the object 7 would be supported for movement in order to reduce friction between transport plane 14 and object 7.

In the weighing station 13, the object 7 is supported by the transport plane 14 and is moved along the transport plane 14 in direction of movement x. The object 7 is actively driven by the mover 2, e.g. with the driver 12, along the transport plane 14. At the end of the transport plane 14 the transport plane 14 transitions into a downward ramp 15 by which the object 7 is lowered again and is positioned on the track 4 for onward movement along the track 4. Also on the downward ramp 15, the object is driven by the mover 2. The downward ramp 15 could of course also be provided with suitable bearings (e.g. rotating rollers or balls) on which the object 7 would slide downward in order to reduce friction between ramp 15 and object 7.

The upward ramp 11 and/or the downward ramp 15 are preferably mechanically separated from the transport plane 14 in the weighing station 13, so that the weight of the ramps 11, 15 are not weighed by the weighing station 13.

The object 7 could of course be moved through the weighing station 13 in both possible directions and could thereby be weighed.

The weighing station 13 rests (also in the sense of hanging) on at least one weigh cell 16 that is stationary arranged, e.g. on the track 4 or on a stationary construction of the conveyor 1 or a facility floor, wall or ceiling. The weigh cell 16 measures the weight resting on the weigh cell 16. This is the weight of the weighing station 13 and the weight of the object 7, if present in the weighing station 13. As the weight of the weighing station 13 is known it can simply be subtracted from the measured weight in order to obtain the weight of the object 7. If a carrier is used for transporting a part, the known weight of the carrier could also be subtracted in order to get the weight of the transported part. It is also possible that the weighing station 13 tares itself, or with an empty carrier, regularly in order to obtain updates of the weight of the weighing station 13.

For the weighing station 13 the invention, it is not necessary to interrupt the track 4. The mover 2 is simply moved along the track 4 for weighing.

Figure 3:
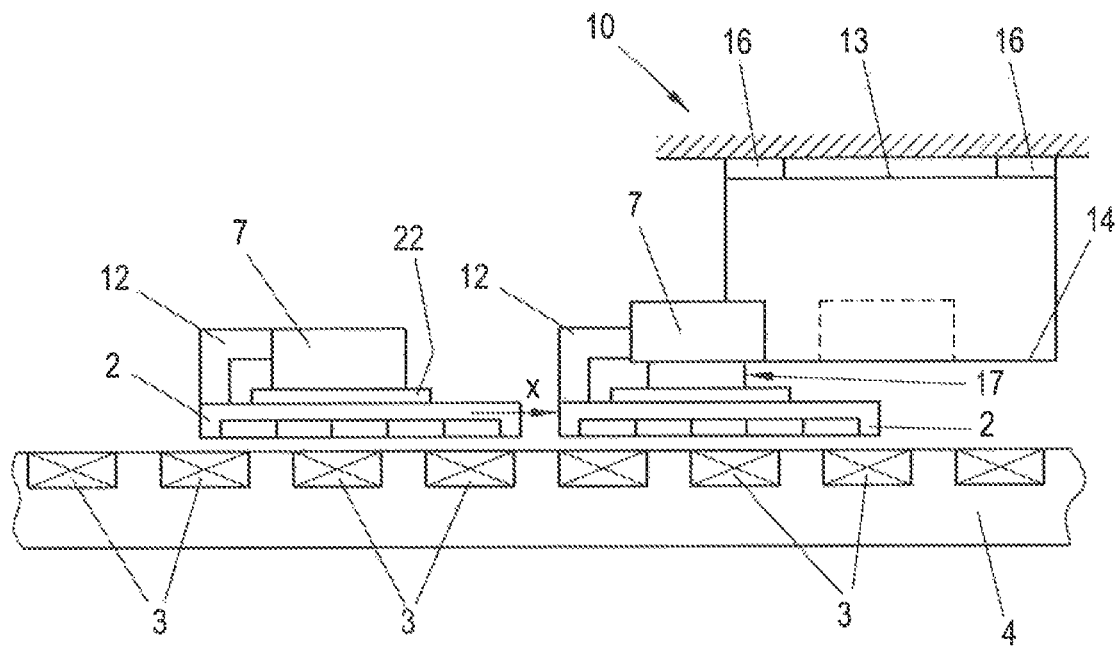
FIG. 3 shows a weighing station of the conveyor according to a second embodiment.

In the embodiment of FIG. 2 the object 7 is passively lifted off the mover 2 and set down on the transport plane 14 by the ramps 11, 15 and the movement of the mover 2 along the track 4. The object 7 could also be actively lifted off upstream (with respect to the direction of movement x) of the weighing station 13. To this end the mover 2 could comprise a lifting drive 17, e.g. an electric, magnetic, piezoelectric, hydraulic or pneumatic drive, as active lifting device, by which the object 7 is lifted off the mover 2, or to be more precise be lifted off from the object support 22 of the mover 2, so that the object 7 can engage the transport plane 14 of the weighing station 13 (FIG. 3). The active lifting device could also be arranged upstream of the weighing station 13 on a stationary part, e.g. on the track 4 or another stationary part of the conveyor or the surroundings. Once the object 7 is in the region of the transport plane 14 the object 7 can be set down on the transport plane 14 by the lifting drive 17 (indicated in dashed lines in FIG. 3) in order to isolate the weight of the object 7 from the mover 2. It is also possible that the weighing station 13 itself comprises a lifting drive 17 for lifting the weighing station 13 (with the at least one weigh cell 16) when a mover 2 with an object 7 enters the weighing stations 13. By that the object 7 could also be lifted off the mover 2 and set down on the transport plane 14. While the object 7 is lifted by the active lifting drive 17 and moved through the weighing station 13 on the transport plane 14 it is actively driven by the mover 2 via the driver 12. At the end of the weighing station 13 the object 7 could be lifted off the transport plane 14 with the lifting drive 17 and set down on the mover 2 in order to safely engage the object 7 with the mover 2. Only a small lifting height would be required for actively lifting off the object 7 from the mover 2.

As a planar motor is able to move the mover 2 not only in the defined movement plane but usually also in a direction normal on the movement plane, the planar motor itself could act as active lifting device and could provide the required lifting operation. In this case the mover 2 with the object 7 would be lifted by the planar motor before it enters the weighing station 13. In the weighing station 13 the mover 2 is lowered so that the object 7 is set down on the at least one transport plane 14 of the weighing station 13 so that the object 7 is lifted off from the mover 2. At the end of the weighing station 13, the object 7 could again be lifted off by the mover 2 of the planar motor.

To lift off the object 7 from the mover 2 means that the object 7 is separated from the object support 22 (see e.g. FIG. 5) of the mover 2. This can mean that the object is lifted off from the mover 2 as in the case of a passive lifting device (FIG. 2) or in case of a weighing station 13 that is lifted by a lifting drive 17 or in case of a stationary active lifting device. This can also mean that the object 7 is lifted off from the object support 22 and is still carried by the mover 2 (at least outside of the weighing station 13) as in the case of an active lifting device on the mover 2 (FIG. 3) or in a planar motor that lifts the object itself. But in all cases is the object 7 supported by the at least one transport plane 14 in the weighing station 13 and is actively driven by the mover 2 in the weighing station 13.

In the embodiment of FIG. 3 the weighing station 13 hangs on stationary arranged weigh cells 16.

Figure 4:
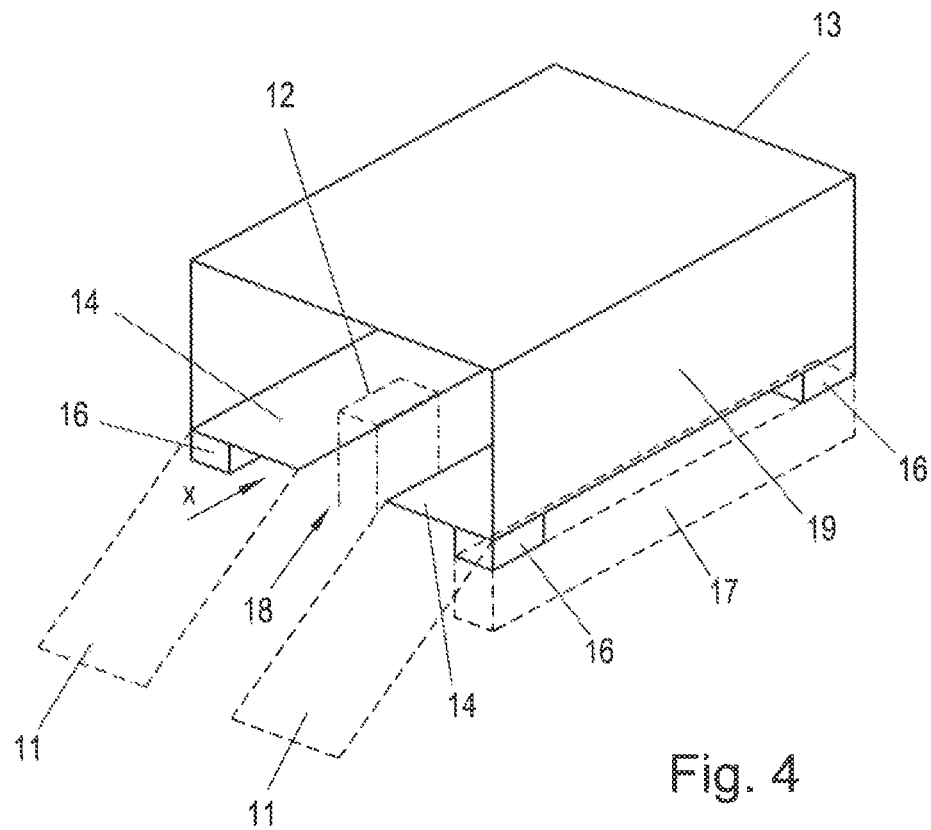
FIG. 4 shows a perspective view of a weighing station.

FIG. 4 shows an embodiment of the weighing station 13 with two transport planes 14, one on each side (as seen in direction of movement x through the weighing station 13). Between the transport planes 14 is a gap 18 through which the driver 12 of a mover 2 can reach through (indicated in dashed lines in FIG. 4). The weighing station 13 can have a housing, e.g. for hygienic reasons as shown in FIG. 4. In the embodiment of FIG. 4 a weigh cell 16 is arranged in every corner of the weighing station 13.

In FIG. 4 also possible lifting devices are indicated by dashed lines. Shown are for example ramps 11 on both sides. Also indicated with dashed lines is an active lifting drive 17 for lifting the weighing station 13 with the weigh cells 16. For a weighing station 13 only one embodiment of a lifting device is required.

Figure 5:
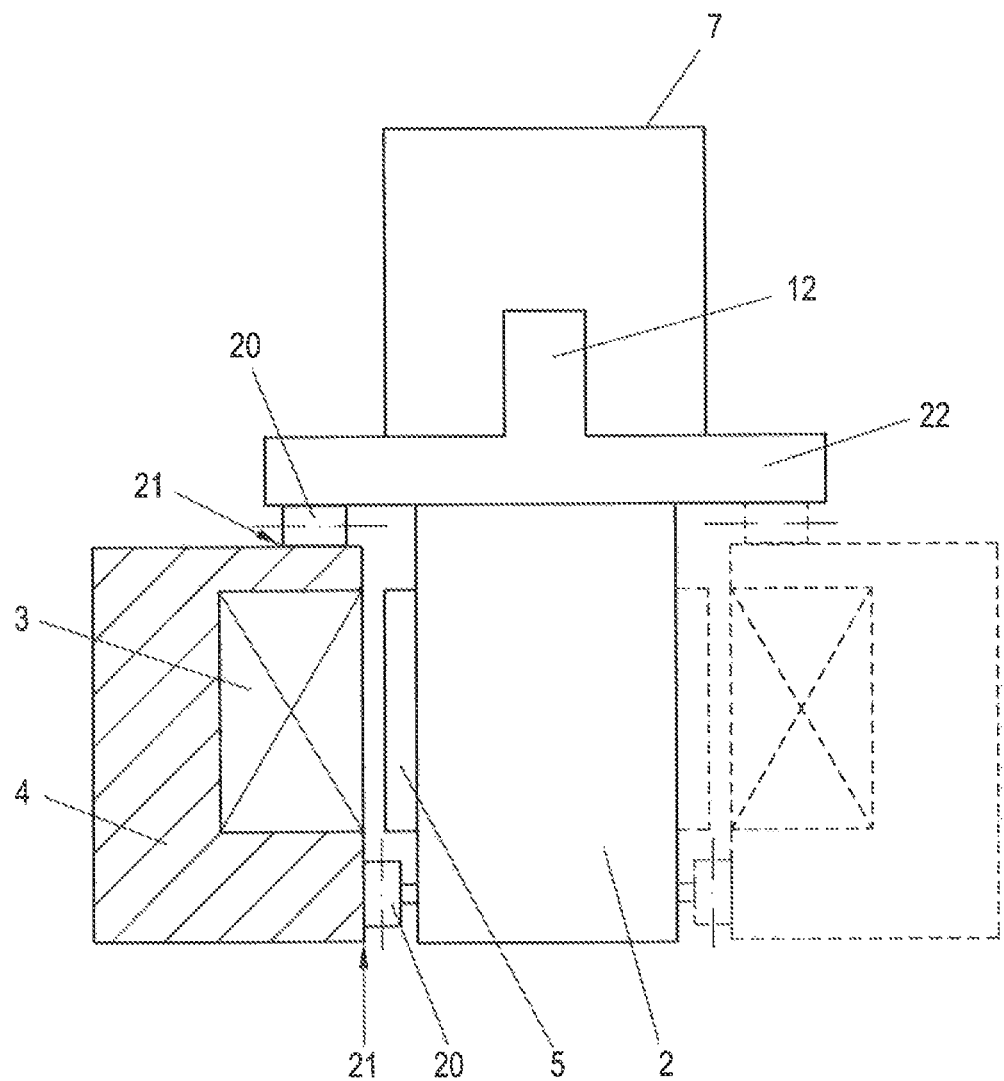
FIG. 5 shows a cross section viewed in direction of movement of an embodiment of the track and mover.

FIG. 5 shows an embodiment of a mover 2 in a cross section through the track 4. In this embodiment the driving magnet 5 is arranged on a side surface (as seen in direction of movement x) of the mover 2. The track 4 is arranged at the corresponding side of the mover 2. The drive coils 3 are arranged facing the driving magnets 5, either next to each other (linear motor) or in a plane (planar motor). It is also possible that tracks 4 with (or without) drive coils 3 are arranged on both sides of the mover 2 as indicated with dashed lines in FIG. 5. In the latter case, there were provided driving magnets 5 on each side of the mover 2 as well.

In FIG. 5 also guiding elements 20 (here rollers) on the mover 2 are indicated that interact with guiding structures 21 (here rolling surfaces) on the track 4.

As the object 7 is supported by the transport plane 14 in the weighing station 13 it is possible to weigh the weight of the object 7 with the at least one weigh cell 16 of the weighing station 13. This can be done while the object 7 is moved through the weighing station 13 with a certain speed. The speed of the mover 2 (that is controlled by the control system 6) in the weighing station 13 could also be set to a different speed (usually to a lower speed) as outside of the weighing station 13 (upstream or downstream of the weighing station 13). Alternatively, the object 7 could temporarily be stopped in the weighing station 13 for weighing.

If the weighing station 13 rests on more then one weigh cell 16, the weight of the object 7 could be determined with more than one weigh cell 16 and the determined weights could then be averaged in order to obtain the weight of the object 7. This could increase the accuracy of the weighing. In an advantageous embodiment, the weighing station 13 rests on a weigh cell 16 at every corner of the weighing station 13. The weight is determined with all provided weigh cells 16 and is then averaged.

It is also possible to determine the weight with a weigh cell 16 several times whilst the object 7 is moved through the weighing station 13. The such determined several weights can then be averaged to obtain the weight of the object 7 with the weigh cell 16. This can increase the accuracy of the weighing. This could also be combined with averaging the weights determined by different weigh cells 16, as described above, in order to increase the accuracy further.

For determining the weight of the object 7 an evaluation unit (evaluator) 25 (computer hardware and/or software) could be provided. The evaluation unit 25 could be integrated into the control system 6 of the electromagnetic conveyor 1, preferably as software component. The evaluation unit 25 receives the measured values of the at least one weigh cell 16 for determining the weight. The weigh cell 16 could provide an electrical signal that corresponds to a certain weight. The evaluation unit 25 would then evaluate the electrical signal, which would preferably comprise digitization of the electrical signal in an A/D converter, in order to determine the weight. The weigh cell 16 itself could also determine the weight and could provide the weight digitally to the evaluation unit 25, e.g. via data communication over a data bus. The evaluation unit 25 can also be prepared to receive signals or data from several weigh cells 16 and to average weights as described above.

The determined weight W could also be provided to a control unit 26 of the manufacturing or production plant or process (see e.g. FIG. 2) in order to control or influence the manufacturing or production plant or process. The evaluation unit 25 could also be integrated in the control unit 26.

The weighing station 13, e.g. of an inline checkweigher 10, could for example be arranged downstream of a filling station for filling a container (object 7) with a media. The determined weight W could be used to control the filling operation. The obtained weight of the object 7 could also be used to control the path of the movers 2 of the conveyor 1. Via a controlled switch (e.g. as described in US 2016/0380562 A1), objects with a first weight could be routed on a first track, whereas objects with a different weight could be routed on a second track.

Depending on the length of the weighing station 13 in direction of movement x, it is also possible to simultaneously weigh the weight of more than one object 7. To this end, more than one object 7 would simultaneously be set down on the at least one transport plane 14 of the weighing station 13 and be moved through the weighing station 13 by its associated mover 2. The weight determined with the at least one weigh cell 16 of the weighing station 13 would then be the weight of all objects present in the weighing station 13.

If the object 7 comprises a carrier for carrying a part to be transported by the electromagnetic conveyor 1, the weighing station 13 could be used to determine the weight of the carrier, in that an empty carrier is moved through the weighing station 13 and weighed thereby.

If the electromagnetic conveyor 1 is in the form of a planar motor, the direction of movement x can be any direction in the movement plane of the mover 2. In case of a linear motor, the possible directions of movement x are defined by the track 4.

Every suitable weighing sensor could be used in a weigh cell 16. The weigh cell 16 could for example be a load cell, e.g. a strain gauge or piezoelectric load cell. But capacitive or inductive sensors could also be used in a weigh cell 16. The weigh cell 16 usually has the required electronics integrated to convert the measurement value into an electrical signal or digital value representative for the measured weight. But this conversion could also be done in the evaluation unit 25.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for weighing an object transported on a mover of an electromagnetic conveyor, the mover being moved along a stationary track of the electromagnetic conveyor in a direction of movement, the method comprising:

lifting the object off the mover with a lifting device, whereby the object is separated from an object support of the mover;

setting down the object onto at least one transport plane of a weighing station arranged in a weighing region of the stationary track, wherein the at least one transport plane, which is located on at least one weigh cell, extends in the direction of movement to support the object when in the weighing station;

actively driving the object, while lifted off from the mover and while supported on the at least one transport plane, with the mover that is moved along the track through the weighing region, wherein a driver is arranged on the mover to engage with the object;

weighing the object with the at least one weigh cell while the object is supported by the at least one the transport plane of the weighing station and while the object is moved through the weighing station with a certain speed; and setting down the object on the mover after weighing in the weighing station for onward movement of the object along the stationary track with the mover.

2. The method according to claim 1, wherein the object engages an upward ramp upstream of the weighing station and slides up the upward ramp until it reaches the transport plane as the mover is moved along the track.

3. The method according to claim 1, wherein the object engages a downward ramp downstream of the weighing station and slides down the downward ramp as the mover is moved along the track.

4. The method according to claim 1, wherein the object is at least one of lifted off the mover or set down on the mover by a lifting drive.

5. The method according to claim 1, wherein the mover is one of: moved with a speed lower than a speed outside of the weighing station during weighing in the weighing station.

6. The method according to claim 1, wherein the object is weighed with more than one weigh cell and the weights obtained by the weigh cells are averaged for determining the weight of the object.

7. The method according to claim 1, wherein the object is weighed more than one time in the weighing station and the weights obtained are averaged for determining the weight of the object.

8. An electromagnetic conveyor, comprising:
a stationary track, along which a mover is transported in a direction of movement;
a weighing station, which is arranged at a weighing region of the stationary track and on at least one weigh cell for weighing an object, the weighing station comprising at least one transport plane extending in the direction of movement;
a lifting device configured to lift the object off the mover, whereby the object is separated from an object support of the mover, and to set the object down on the at least one transport plane, which supports the object when in the weighing station; and
a driver, which is arranged on the mover, is configured to engage the object throughout the transporting of the mover along the stationary track through the weighing region, whereby the object is actively driven by the mover while lifted off from the mover and while supported on the transport plane,
wherein a weight of the object is evaluated from measurement values representative of the measured weight of the object obtained by the at least one weigh cell while the object is moving through the weighing station with a certain speed.

9. The electromagnetic conveyor according to claim 8, further comprising an upward ramp arranged upstream of the weighing station, the upward ramp being arranged to lift the object off the mover and to place the object on the at least one transport plane as the mover is moved along the track.

10. The electromagnetic conveyor according to claim 8, further comprising a downward ramp arranged downstream of the weighing station, the downward ramp being arranged to place the object on the mover as the mover is moved along the track.

11. The electromagnetic conveyor according to claim 8, further comprising a lifting drive configured to lift the object off the mover and to set the object down on the at least one transport plane.

12. The electromagnetic conveyor according to claim 11, wherein the lifting drive is arranged on the mover.

13. The electromagnetic conveyor according to claim 11, wherein the lifting drive is stationarily arranged with respect to the stationary track.

14. The electromagnetic conveyor according to claim 13, wherein the lifting drive is configured to lift the weighing station.

15. The electromagnetic conveyer according to claim 11, further comprising an evaluator connected to the at least one weigh cell.

* * * * *